United States Patent [19]

Benhabib et al.

[11] Patent Number: 5,901,213
[45] Date of Patent: * May 4, 1999

[54] METHOD FOR PROVIDING VIRTUAL DEDICATED ACCESS TO AN INTER-EXCHANGE CARRIER

[75] Inventors: Jose Benhabib, Freehold; Sekar Ganesan, Tinton Falls; Gerald F. Healey, Spring Lake Heights; David George Lewis, Freehold; Robert Andrew Malmi, Middletown; Leslie Ellen Morton, Holmdel; Alan M. Weinstock, Bedminster, all of N.J.

[73] Assignee: AT&T Corp, Middletown, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/740,590

[22] Filed: Oct. 31, 1996

[51] Int. Cl.⁶ ........................................... H04M 3/42
[52] U.S. Cl. ..................... 379/220; 379/139; 379/201; 379/207; 379/219
[58] Field of Search ........................ 379/201, 207, 379/211, 212, 219, 220, 221, 229, 230, 111, 112, 113, 139, 265, 266, 309, 142, 215

[56] References Cited

U.S. PATENT DOCUMENTS

| 5,335,269 | 8/1994 | Steinlicht | 379/266 |
| 5,539,817 | 7/1996 | Wilkes | 379/230 |
| 5,583,926 | 12/1996 | Venier et al. | 379/207 |
| 5,689,555 | 11/1997 | Sonnenberg | 379/219 |
| 5,696,816 | 12/1997 | Sonnenberg | 379/207 |

*Primary Examiner*—Ahmad F. Matar
*Assistant Examiner*—Scott Wolinsky
*Attorney, Agent, or Firm*—Robert B. Levy

[57] ABSTRACT

Virtual dedicated access of telecommunication subscribers (12, 14 and 16) to an inter-exchange carrier (IXC) (20) is provided by way of an intelligent local End Office switch (180) that routes calls either to the IXC or to a local End Office switch (18). The intelligent local End Office switch (180) advantageously serves to perform inter-exchange processing of calls, as required, for calls that originate with, or terminate at, a customer rather than automatically route calls to the IXC for such inter-exchange processing, as was previously required.

11 Claims, 4 Drawing Sheets

METHOD FOR PROVIDING VIRTUAL DEDICATED ACCESS TO AN INTER-EXCHANGE CARRIER

TECHNICAL FIELD

This invention relates to a technique for providing inter-exchange telecommunications services using dedicated access facilities between a customer premises and a local End Office.

BACKGROUND ART

Present day telecommunications networks generally include one or more local end offices for providing service (i.e., dial tone) to subscribers. Depending on their geographic proximity, a calling and called parties may receive dial tone from the same local End Office switch. Thus, the same local End Office switch will handles the call between the calling and called parties. Often, the calling and called parties lie in different Local Telephone Access Areas (LATAs) and are served by different local End Office switches. Under such circumstances, a call initiated by a calling party passes from an originating local End Office switch to an Inter-Exchange Carrier (IXC), such as AT&T. The IXC routes the call from the originating local End Office switch through one or more toll switches to a terminating local End Office switch serving the called party.

Residential and small business customers typically receive both local (intraLATA) and IXC service via their serving local End Office switch. To the extent that calls made by such customers are inter-exchange calls, the originating local End Office switch passes the call to an IXC as described. For customers, such as businesses, schools and governmental agencies, that have a large inter-exchange call volume, it is often more economical to have a direct link to an IXC, thereby bypassing the local End Office switch. Customers that are directly connected to an IXC are often referred to as "nodal" customers since they represent nodes within the IXC network. Customer-requested features (i.e., the manner in which particular customer calls are processed) are dictated by the type of trunk on which the calls are carried to the IXC network. A separate trunk typically connects such nodal customers to their local End Office Switch for local calls.

Depending upon the capability of the IXC, nodal customers can receive certain inter-exchange call processing for calls handled by the IXC carrier. For example, a nodal customer can receive, via the IXC, certain service indicators, such as an internal index (call count) recording the number of calls originated by, or which terminate at, the customer premises, especially in terms of a particular service utilized by the customer. Further, an IXC may afford a nodal customers the ability to employ a private number plan that utilizes numbers different from conventional telephone numbers per the North American Numbering Plan. Additionally, many IXCs provide nodal customers certain inter-exchange call processing in connection with terminating calls, such as Dialed Number Identification Service (DNIS), whereby the customer receives the digits of the called number.

Segregating a nodal customer's local and inter-exchange calls incurs several short comings. For example, while nodal customers gain certain benefits by virtue of their direct connection to an IXC, certain inefficiencies result from having individual trunks associated with separate customers. Further, many nodal customers can not obtain the same type of inter-exchange processing, let alone any inter-exchange processing, for local calls from their local End Office switch that they get from the IXC for inter-exchange calls. To the extent that a nodal customer can get any inter-exchange processing for local calls from their serving local End Office switch, the processing is often different from, and is not coordinated with, the inter-exchange processing obtained from the IXC carrier. In particular, billing for inter-exchange call processing (to the extent such processing is provided by the serving local End Office) is usually different from that provided by the IXC.

Thus, there is a need for an improved technique for providing inter-exchange processing for local and inter-exchange calls.

BRIEF SUMMARY OF THE INVENTION

Briefly, the present invention concerns a method for providing inter-exchange processing, at least in part, for customer telephone calls without the need to route such calls to an inter-exchange network. Such inter-exchange processing services include call screening, billing, and routing determination. Pursuant to the invention, inter-exchange calls originated by a customer receive inter-exchange processing by routing each call originating with, or terminating at, a customer premises, through an intelligent local End Office Switch. The intelligent local End Office Switch processes each call in accordance with its status to determine whether the call requires inter-exchange processing. If the call requires inter-exchange processing, then the intelligent local End Office Switch provides such processing, in accordance with the call status and customer preferences, rather than automatically routing the call to the IXC as was previously the case. Additionally, the intelligent local End Office Switch also determines the call destination. In other words, the intelligent local End Office Switch determines whether the call is a local (intra-exchange) or inter-exchange call. Depending on the call destination, the intelligent local End Office Switch routes the call locally, such as to a local exchange carrier, or to an inter-exchange carrier, or to customer premises equipment connected directly to the intelligent local End Office switch. Additionally, to the extent necessary, the intelligent local End Office switch will coordinate inter-exchange processing with the IXC carrier.

DETAILED DESCRIPTION

Figure 1:
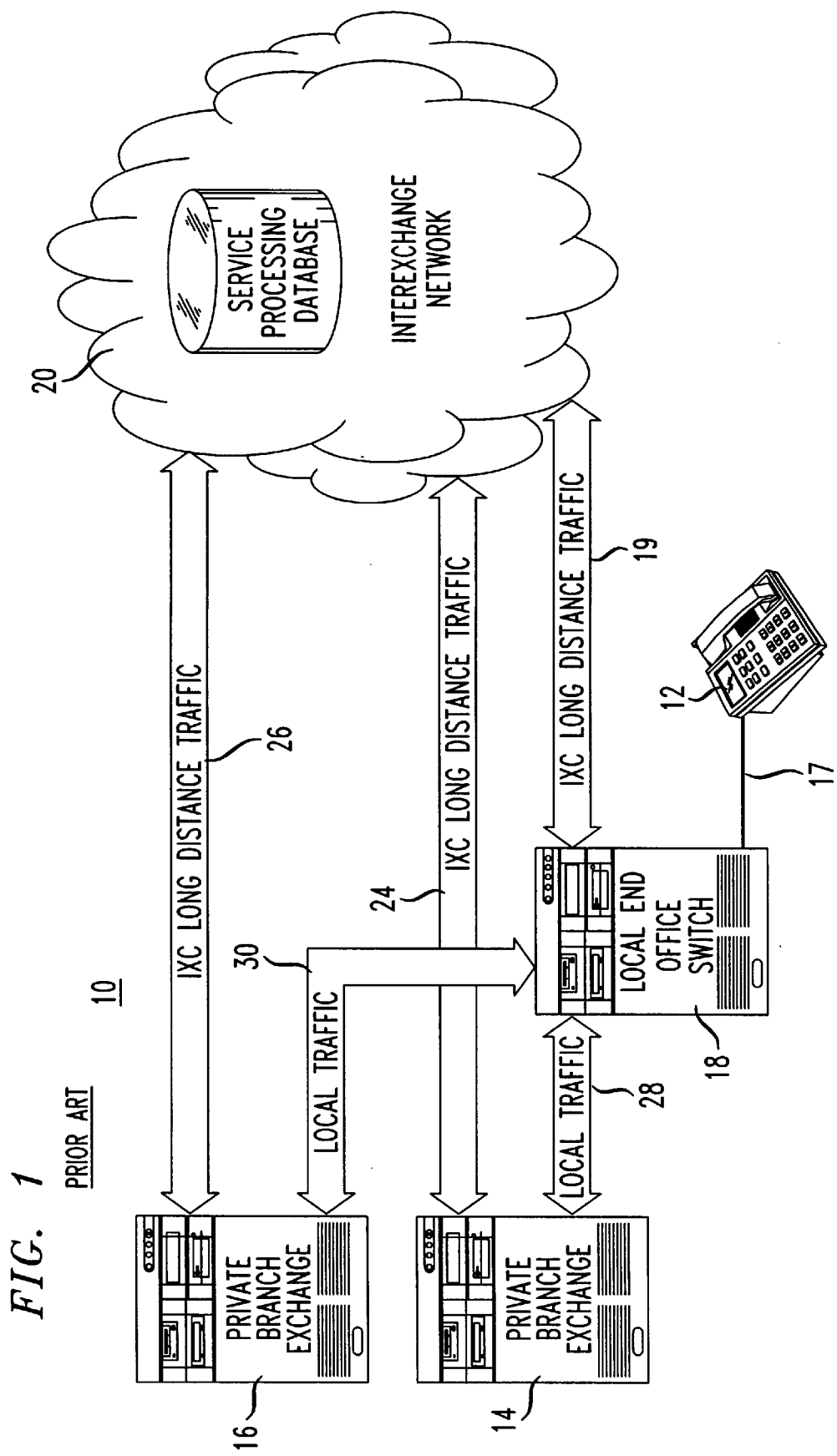
FIG. 1 is block schematic diagram of a telecommunications network according to the prior art.

FIG. 1 illustrates a prior art network 10 for providing telecommunications services to various customers that are depicted by Customer Premises Equipments (CPEs) 12, 14 and 16. The CPE 12 represents a customer that is connected via a single line 17 to a local End Office Switch 18 maintained by a Local Exchange Carrier (LEC). All calls originating from the CPE 12 pass to the local End Office Switch 18 via the line 17. The switch 18 routes the calls either locally, or via a trunk 19, to an Inter-Exchange Carrier (IXC) network 20, such as that maintained by AT&T. The local End Office Switch 18 determines the destination of the call by the digits dialed by the customer. The customer associated with the CPE 12 is commonly referred to as a "line" customer. Although FIG. 1 depicts only a single line customer (CPE 12), the network 10 may include many line customers.

In the illustrated embodiment, the CPEs 14 and 16 represent Private Branch Exchanges (PBXs) employed by large customers, (e.g., stores, schools, office buildings, factories, etc.) Each of the CPEs 14 and 16 serves many individual telephone extensions (not shown). In practice, the CPEs 14 and 16 generate a sufficient volume of inter-exchange traffic to warrant a direct link, via trunks 24 and 26, respectively, to the IXC network 20 so that the CPEs become separate nodes within the network. For this reason the customers associated the CPEs 14 and 16 are commonly referred to as "nodal" customers. While FIG. 1 depicts only two nodal customers (CPEs 14 and 16), the network 10 may include a plurality of such customers.

Not all calls originating with, or terminating at, each of the CPEs 14 and 16 are inter-exchange calls. Rather, the CPEs 12 and 14 may generate be local calls, (i.e., calls destined for subscribers in the same LATA). To that end, trunks 28 and 30 connect the CPEs 14 and 16, respectively, to the local End Office Switch 18.

The telecommunications network described above incurs several short comings. For example, the CPEs 14 and 16 segregate local and inter-exchange traffic on separate trunks. From the standpoint of the IXC network 20, there is an inefficiency associated with receiving inter-exchange traffic on the separate trunks 24 and 26. Additionally, it may be desirable to provide local calls via inter-exchange processing, which previously has not been practical in the local End Office Switch 18. For example, it may be desirable to bill local calls in the same manner that inter-exchange calls are billed. Typically, AT&T bills certain types of calls processed within its network to certain Wide Area Telephone Service (WATS) numbers. For customers of AT&T, it is desirable that any processing associated with such calls be billed to the same number which is presently not the case since the LECs use separate billing numbers. Additionally, calls processed by the IXC network 20 commonly receive service indicators, such as indices reflecting call counts, whereas the local End Office switch 18 may not provide such indicators, or at least provide them in the same manner as the IXC.

Figure 2:
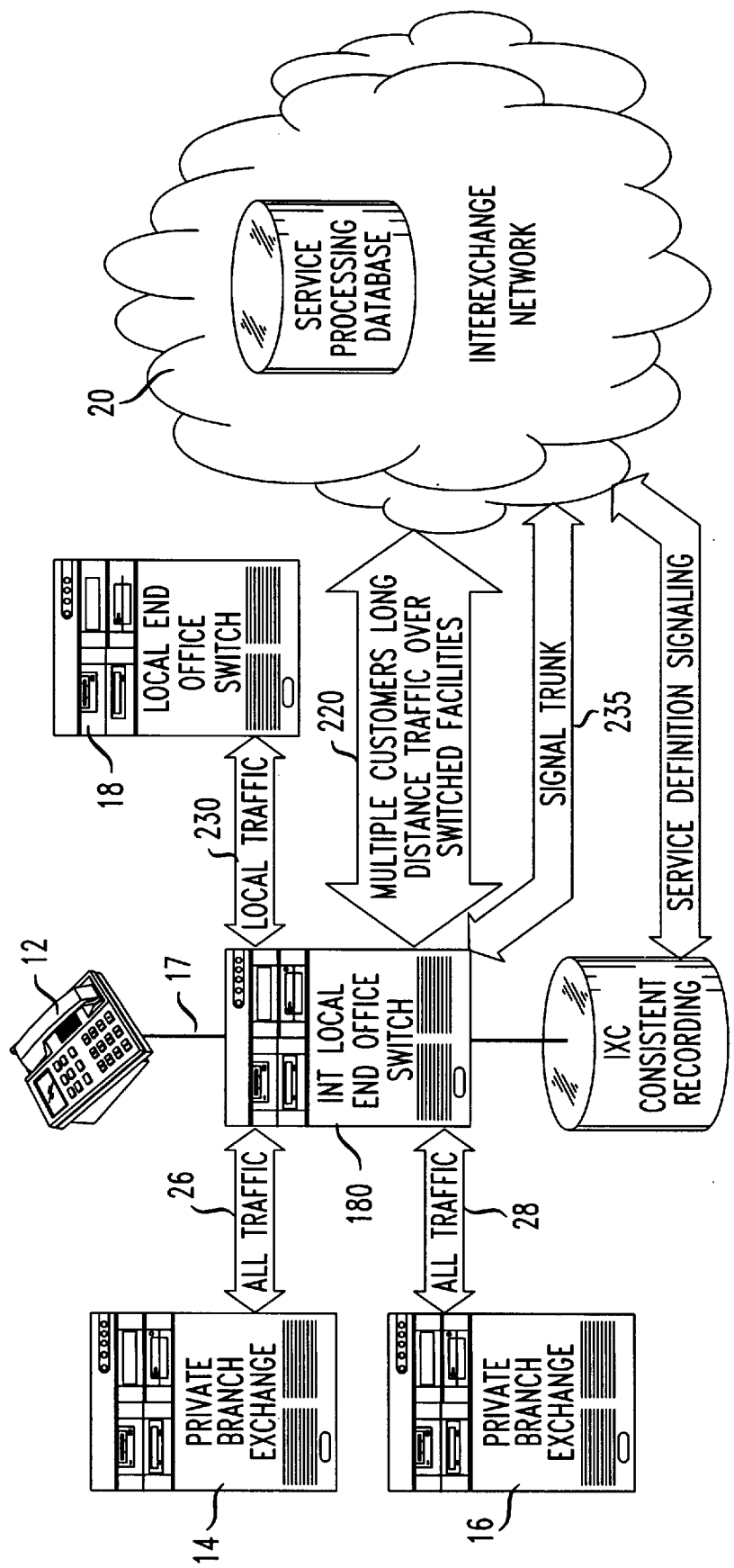
FIG. 2 is a block schematic diagram of a telecommunications network in accordance with the invention.

FIG. 2 shows a telephone network 100 in accordance with the present invention for providing inter-exchange call processing, as needed, for all calls originating with, or terminating at a customers premises, such as CPE 12, 14 and 16. The network 100 of FIG. 2 differs from the network 10 of FIG. 1 in that line 17 and trunks 24 and 26 couple the CPEs 12, 14 and 16, respectively, to an intelligent local End Office Switch 180. The switch 180 typically comprises a Central Office switch. Thus, all calls (including both local and inter-exchange calls) originating or terminating at the CPEs 12, 14 and 16 pass via the intelligent local End Office Switch 180.

The intelligent local End Office Switch 180 is coupled via a first trunk 220 to the IXC network 20 and via a second trunk 230 to the local End Office Switch 18 maintained by the LEC. A signaling trunk 235 also connects the intelligent local End Office Switch 180 to the IXC 20. As will be discussed in greater detail hereinafter, the intelligent local End Office Switch 180 has the ability to route inter-exchange calls to the IXC network 20 and to route local calls to the local End Office Switch 18.

Figure 3:
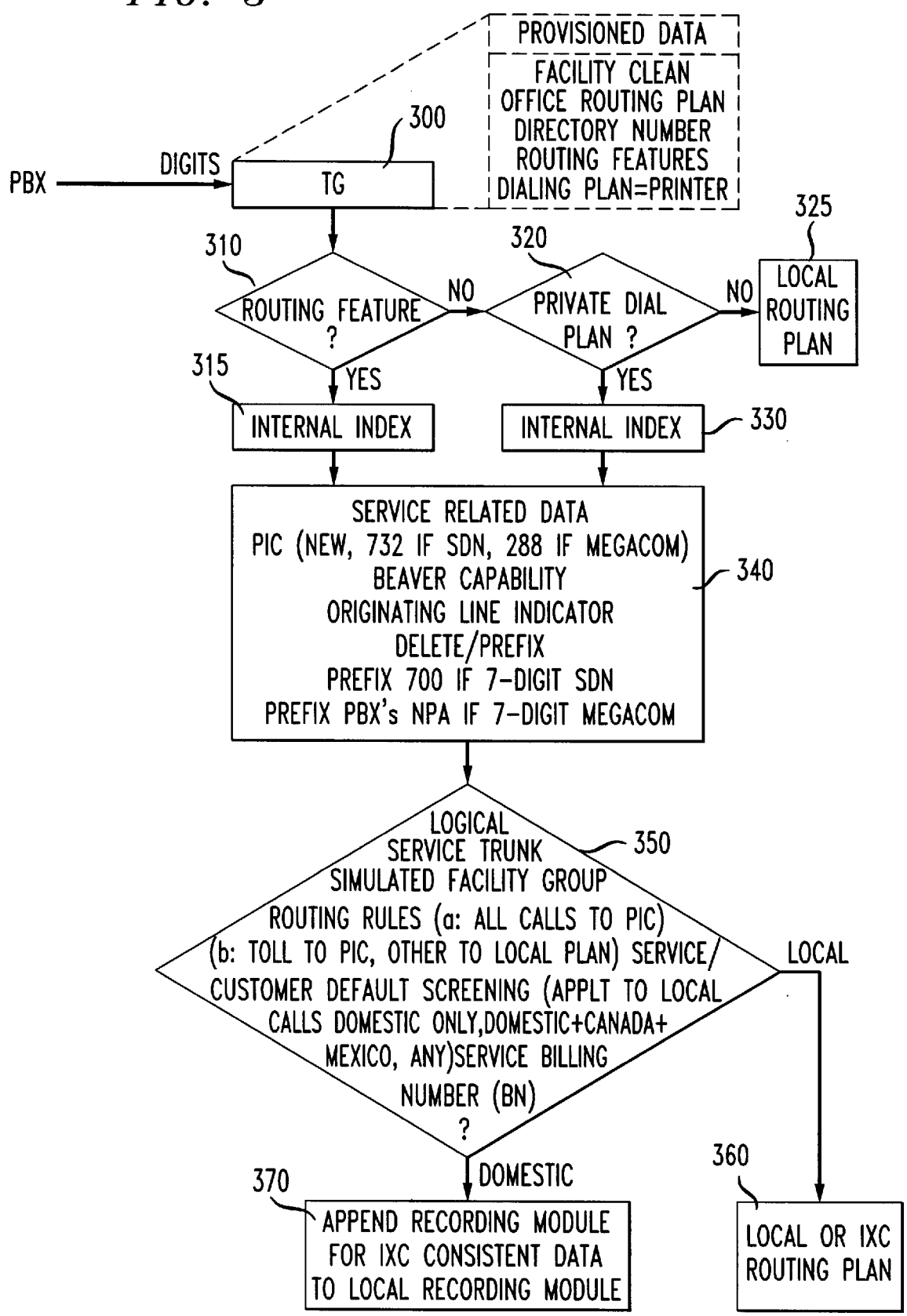
FIG. 3 is a flow chart diagram depicting call processing in an originating intelligent local End Office Switch within the telecommunications network of FIG. 2.

To better appreciate the manner in which the intelligent local End Office Switch 180 of FIG. 2 provides inter-exchange processing of all calls, as necessary, reference should be had to FIG. 3 which illustrates a flow chart diagram depicting the manner in which the intelligent local End Office Switch processes outgoing customer calls. In practice, the calls originated by nodal customers (e.g., CPEs 14 and 16) typically receive inter-exchange processing by the intelligent local End Office Switch 180. (Normally, the calls originated by line customers (e.g., CPE 12) generally require no inter-exchange processing. However, to the extent that such calls may require inter-exchange processing, the intelligent local End Office Switch 180 has the capability, as described hereinafter, to provide such call processing.)

As depicted in FIG. 3, the intelligent local End Office switch 180 provides inter-exchange call processing by first collecting the digits from calls originating at each nodal customer (i.e., each of the CPEs 14 and 16). The intelligent local End Office Switch 180 initially processes collected digits (step 300) in accordance with the trunk group (TG) on which such digits arrived. In particular, during step 300, the digits associated with calls on selected trunk groups (e.g., trunk groups 26 and 28) are "traced" (analyzed) to determine:

(a) whether the call is of a type that associated with a defined inter-exchange service, (In other words, whether the call requires inter-exchange processing);

(b) whether the call should be processed at the intelligent local End Office Switch 180 or in the IXC network 20 of FIG. 2; and c) if the call is processed at the intelligent local End Office Switch 180, should results of such processing be apparent to the customer.

The nature of the trunk on which the digits are collected may dictate an IXC service having certain parameters, such as a facility class, an office routing plan, and a directory number. Also, the trunk group may dictate the collected digits represent private numbers, or "public numbers" (i.e., those associated with the North American Dialing Plan that are routed in a manner that is independent of the customer that originated the call). The intelligent local End Office Switch 180 further processes the collected digits (step 310) to determine whether the call should be routed in accordance with the normal routing plan for the Switch 180 or whether the call must be routed consistent with certain IXC service indicators. Once such IXC service indicator may be an internal index (i.e., a call count in accordance with the customer and type of service) that is completed during step 315.

A critical step in connection with the call processing completed by the intelligent local End Office Switch 180 involves the analysis of the collected digits during step 320. During step 320, the intelligent local End Office switch 180 of FIG. 2 determines whether the digits represent a call associated with a public dial plan or a private dial plan. Public dial plan calls include 0+/0– calls as well as 00 calls, 500, 800, 888, 900, N11 and 10XXX calls, to name just a few. These calls are routed in accordance with a well defined routing plan that is independent of the customer that originated the call. In contrast, private dial plans involve numbers that are routed based on the customer. For example, large entities, such as corporations and government agencies typically employ private call plans whereby the numbers specify routing to locations that are specific to the customer, and are different than the those specified by the conventional North American Number Plan. Such private dial calls are routed during step 325 in accordance with a local routing plan maintained by the intelligent local End Office Switch 180.

Calls not previously indexed during step 315, and not found to be private dial plan calls are typically indexed (counted) during step 330. Calls that are indexed during one of steps 315 and 330 are then analyzed during step 340 to establish the class of service associated with the call. For example, the calls may originate via AT&T's Software Defined Network Service (SDN) or AT&T's 800 Megacom service, as preselected by the customer, or as indicated by the entry of a carrier Identification Code (CIC) identifying the service. Other service related data is also gathered during step 340, including bearer capacity as well as the identity of the originating line. Additionally, during step 340, a prefix may be added to, or deleted from, the call as appropriate. For example, calls originated as seven digit SDN calls may be prefixed with the number 700. By the same token, seven digit calls originated via a PBX (e.g., CPE 14 or 16) may be prefixed by the PBX's area code. Service related information of the type described above that is developed during step 340 may be communicated to the IXC 20 via the signaling trunk 235.

Following step 340, the collected digits are further analyzed (step 350) to screen the call for routing purposes in accordance with customer-established rules. In particular, during step 350, the intelligent local End Office Switch 180 screens calls to determine which customer calls should be routed to the customer's Pre-subscribed Inter-exchange carrier (PIC) depending on the digits collected from the call. For example, a particular customer may wish all calls (local and inter-exchange calls) to be routed to that customer's PIC. Alternatively, a customer may only wish domestic inter-exchange calls to be routed to the customer's PIC. Under certain circumstances, a customer may wish both domestic inter-exchange call and certain foreign calls to be routed to its PIC. During step 360, the calls are routed in accordance with the screening provided during step 350. During step 370, the intelligent local End Office switch records data associated with the above-described inter-exchange call processing in a manner consistent with the inter-exchange call processing performed in the IXC network 20. The data recorded during step 370 is combined with the data recorded in the IXC network 20 to facilitate delivery to the customer of a single bill to the caller's billing number.

During either of step 350, it may be desirable to perform certain call processing within the IXC network 20, rather than at the intelligent local End Office switch 180. To the extent that such processing at the IXC network 220, the intelligent local End Office switch 180 coordinates such processing, keeping a record of the transaction.

Figure 4:
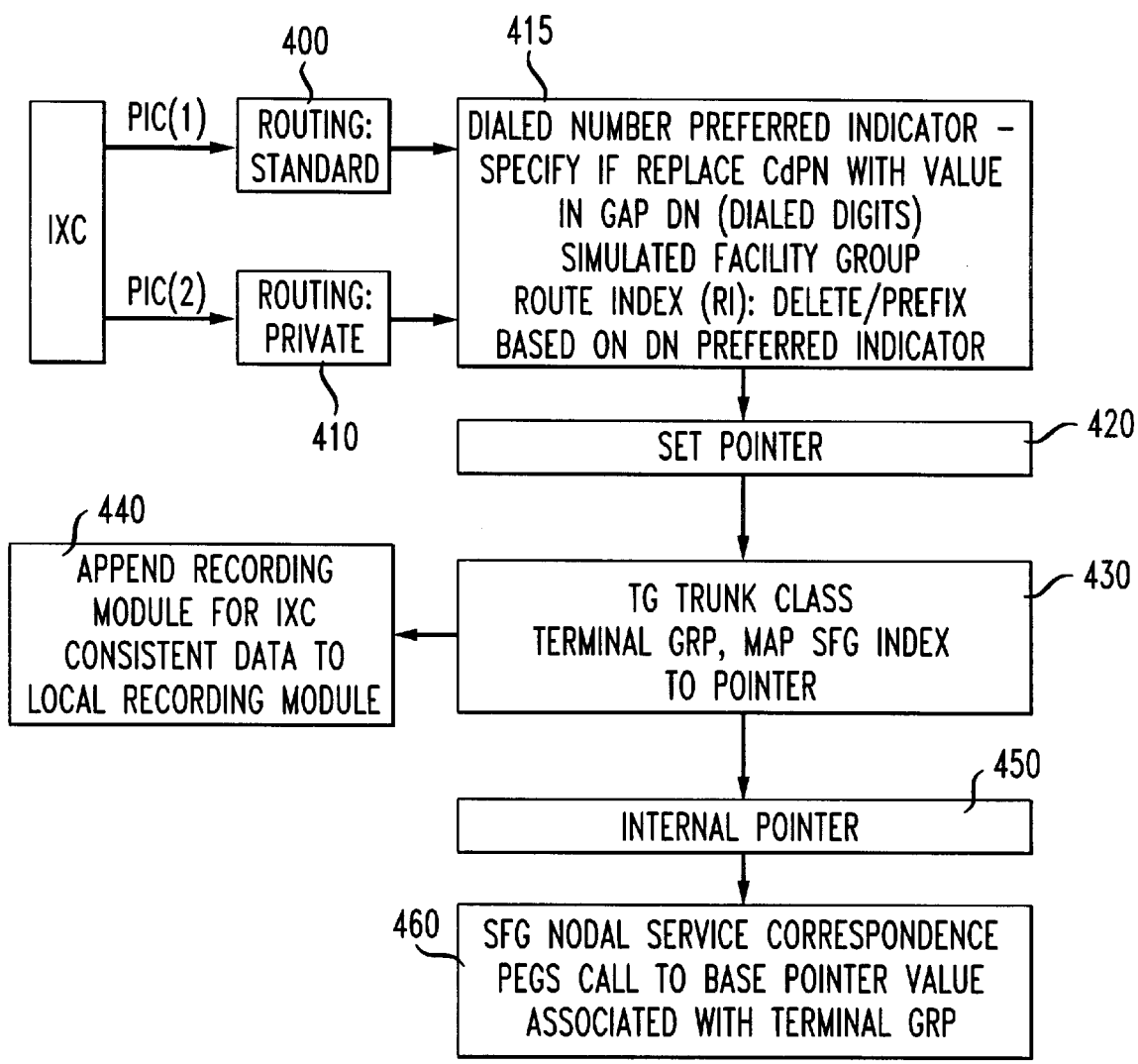
FIG. 4 is a flow chart diagram depicting call processing in a terminating intelligent local End Office Switch within the network of FIG. 2.

FIG. 4 illustrates the steps performed by the intelligent local End Office Switch 180 to provide inter-exchange processing of calls that terminate at the switch. Calls that terminate at the intelligent local End Office Switch 180 may be received via standard routing (step 400) or via private routing (step 410), depending on whether the digits of the terminating call corresponding to a standard number or a private number, respectively.

Regardless of the manner in which the call was routed to the intelligent local End Office Switch 180, the call is processed during step 415. During step 415, the dialed digits may replace the called party number. This may be better understood in the following context. Many customers, especially telemarketers, maintain several different incoming numbers, typically 800 or 888 toll-free numbers. Calls made to any of those numbers are received by the customer on a single trunk (e.g., one of trunks 24 and 26 of FIG. 2). To facilitate call handling, a customer may wish to know which number the caller dialed so callers that dial different numbers may be treated accordingly. For that reason, a customer may specify that the dialed digits replace the called party number (the actual number of the trunk on which all calls arrived). Additionally, if requested by the customer, the intelligent local End Office Switch 180 may also increment a route index (a call count) during step 415.

Following step 415, step 420 is executed and the value of a pointer is set for purposes of tracking within the intelligent local End-Office Switch 180. Step 430 is executed following step 420 and the appropriate trunk group for routing the call to corresponding nodal customer (e.g., CPEs 14 and 16) is established in accordance with the collected digits and the call is routed on that trunk. Step 440 is also executed, whereupon the intelligent local End Office Switch 180 records the call consistent with the call processing, if any, performed by the IXC network 20. Step 450 is executed next during which an internal pointer is set to identify the trunk established during step 430. Step 460 is then executed, whereupon a peg count, reflecting the number of calls to the trunk identified by the pointer set during step 450, is incremented.

The foregoing describes a technique for providing local and inter-exchange call treatment to calls originating from both line and nodal customers, including customers whose premises are connected through bundled lines, e.g., CENTREX, BCRS, etc., by way of an intelligent local End Office Switch (180) that serves to screen calls and provide inter-exchange call processing, as needed, without the necessity to automatically route the call to an IXC network.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. A method for providing inter-exchange processing of telephone calls originating from, and terminating at separate customer premises, comprising the steps of:

routing all telephone calls that originate from, and that terminate at, each customer premises to an intelligent local End Office switch associated with said each customer premises;

establishing for each call received at the intelligent local End Office switch a call status and thereafter processing each call in accordance with its status to determine whether the call should receive, pursuant to customer request, inter-exchange processing heretofore provided at an inter-exchange switch to provide at least one special feature from a group of features including call indexing and special routing, and if so, providing such processing at such intelligent local End Office switch;

determining, for each call received at the intelligent local End Office switch, where the call should be routed; and routing the call in accordance with the routing determination.

2. The method according to claim 1 wherein the intelligent local End Office switch establishes the status of each call by collecting digits associated with the call.

3. The method according to claim 2 wherein the digits are interpolated for inter-exchange processing.

4. The method according to claim 1 wherein the inter-exchange processing provided by the intelligent local End Office switch includes the step of creating an index varying in accordance with a count of calls for the customer premises and type of service accorded thereto.

5. The invention according to claim 1 wherein the inter-exchange processing provided by the intelligent local End Office switch includes the step of screening each call to determine whether the call is a private number.

6. The method according to claim 5 wherein a call determined to be a private number is routed in accordance with said number.

7. The method according to claim 1 wherein the intelligent local End Office switch determines where to route the call in accordance with a pre-established customer preference.

8. The method according to claim 1 further including the step of recording information associated with the inter-exchange processing provided by the intelligent local End Office switch.

9. A method for providing inter-exchange processing of telephone calls originating from, and terminating at separate customer premises, comprising the steps of:

routing all telephone calls that originate from, and that terminate at, each customer premises via an intelligent local End Office switch associated with said each customer premises;

establishing for each call received at the intelligent local End Office switch a call status and thereafter processing each call in accordance with its status to determine whether the call should receive, pursuant to customer request, inter-exchange processing heretofore provided at an inter-exchange switch to provide at least one special feature from a group of features including call indexing and special routing, and if so providing such processing at such intelligent local End Office switch;

determining, for each call received at the intelligent local End Office switch, where the call should be routed; and routing the call in accordance with the routing determination;

wherein the intelligent local End Office switch provides inter-exchange processing of calls terminating at the customer premises by replacing digits of a routing number in a call set-up message associated with said call with digits dialed by a calling party.

10. The method according to claim 9 wherein the inter-exchange processing provided by the intelligent local End Office switch includes the step of creating an index reflective of a call count.

11. The method according to claim 10 further including the step of recording information associated with the inter-exchange processing provided by the intelligent local End Office switch.

* * * * *